(12) United States Patent
Croydon

(10) Patent No.: US 7,368,707 B2
(45) Date of Patent: May 6, 2008

(54) RADIATION DETECTOR INCLUDING MEANS FOR INDICATING SATISFACTORY OPERATION

(75) Inventor: William Frederick Croydon, Romsey (GB)

(73) Assignee: Siemens plc, Oldbury (GB)

( * ) Notice: Subject to any disclaimer, the term of this patent is extended or adjusted under 35 U.S.C. 154(b) by 144 days.

(21) Appl. No.: 10/512,256

(22) PCT Filed: Apr. 23, 2003

(86) PCT No.: PCT/GB03/01728

§ 371 (c)(1),
(2), (4) Date: Apr. 29, 2005

(87) PCT Pub. No.: WO03/091748

PCT Pub. Date: Nov. 6, 2003

(65) Prior Publication Data

US 2005/0199793 A1    Sep. 15, 2005

(30) Foreign Application Priority Data

Apr. 23, 2002   (GB) ................. 0209233.6

(51) Int. Cl.
*G12B 13/00*    (2006.01)
(52) U.S. Cl. .............. 250/252.1; 250/374; 250/386; 250/387; 378/207
(58) Field of Classification Search ........... 250/374, 250/386, 387
See application file for complete search history.

(56) References Cited

U.S. PATENT DOCUMENTS 2,982,857 A    5/1961   Clarke
3,317,823 A  *  5/1967   Brodsky ................. 324/459
3,771,005 A  * 11/1973   Erickson ................ 313/538
3,775,762 A  * 11/1973   Trumble ................. 340/578
4,405,234 A  *  9/1983   Juaire .................. 356/239.7
5,180,917 A  *  1/1993   Wraight ................. 250/374
6,259,099 B1 *  7/2001   Foulon et al. ........... 250/370.14
6,388,250 B1 *  5/2002   Croydon et al. ......... 250/252.1
6,700,496 B2 *  3/2004   Francke et al. ......... 340/578

FOREIGN PATENT DOCUMENTS

JP       57 116276 A         7/1982
JP       57116276 A    *    7/1982

* cited by examiner

*Primary Examiner*—David Porta
*Assistant Examiner*—Yara B Green
(74) *Attorney, Agent, or Firm*—Crowell & Moring LLP

(57) ABSTRACT

A radiation detector, comprising a sensitive volume filled with a counter gas; an anode and a cathode each in communication with the counter gas; a voltage supply for maintaining a potential difference between the anode and the cathode, said potential difference being less than required to cause gas discharge in the counter gas. The radiation detector further comprises a photoemissive material in communication with the sensitive volume. The photoemissive material may be provided as a coating on the cathode. The radiation detector may further comprise a controllable light source for supplying photons of a known wavelength to the photoemissive material. Electrons may be emitted by the photoemissive material in response to the provision of said photons, said electrons causing avalanche breakdown of the counter gas, indicating satisfactory operation of the radiation detector.

15 Claims, 2 Drawing Sheets

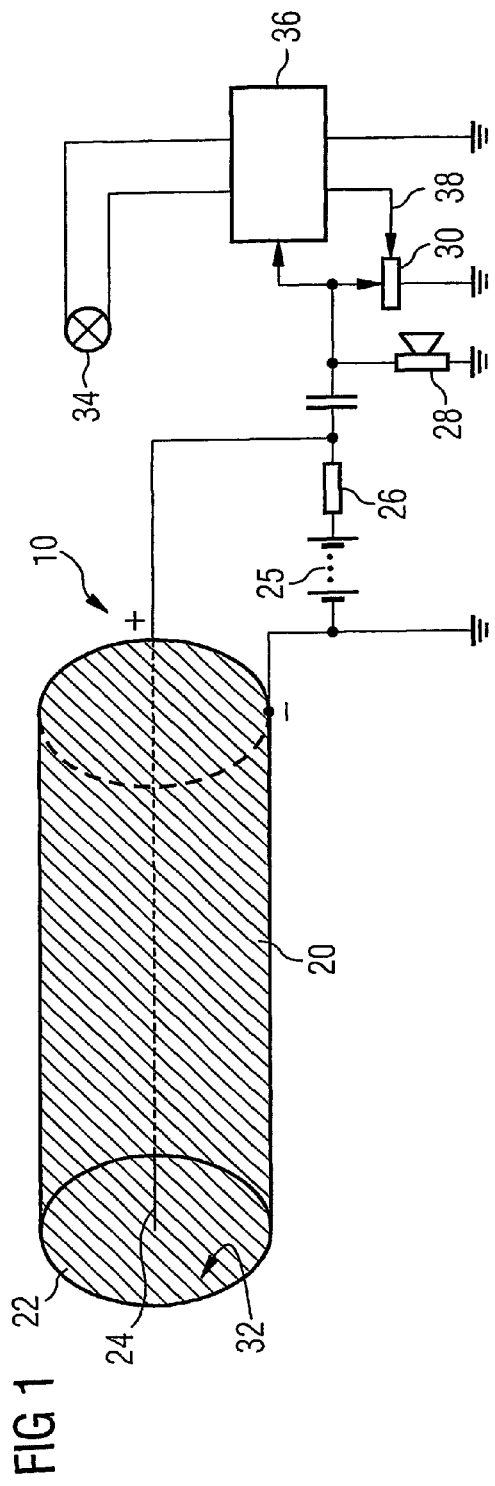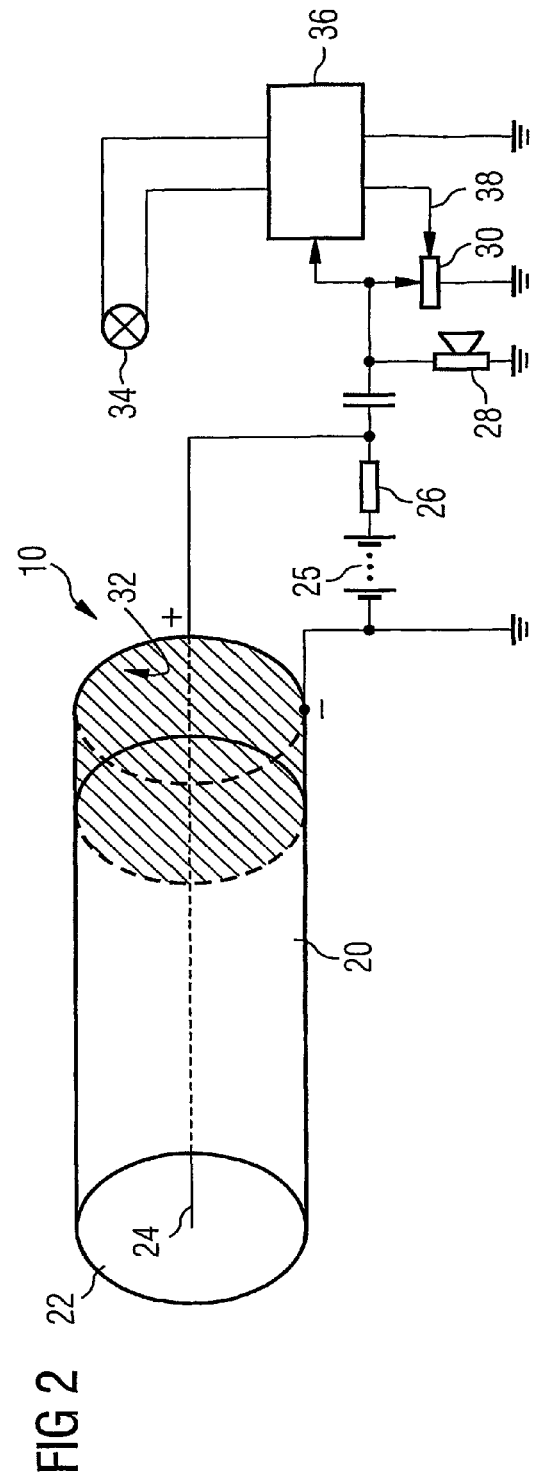

RADIATION DETECTOR INCLUDING MEANS FOR INDICATING SATISFACTORY OPERATION

Figure 3:
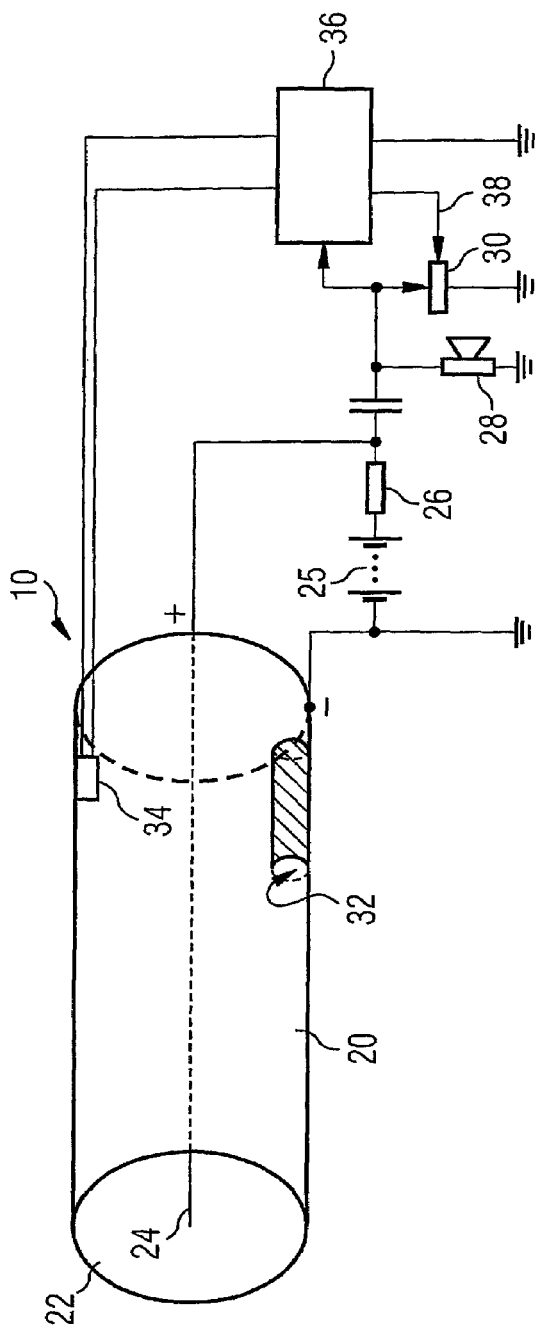

A Geiger-Müller (GM) tube is a gas-filled radiation detector. It commonly takes the form of a cylindrical outer shell (cathode) and the sealed gas-filled space with a thin central wire (the anode) held at ~1 kV positive voltage with respect to the cathode. The fill gas is generally argon at a pressure of less than $10^4$ Pa plus a small quantity of a quenching vapour.

If a gamma-ray interacts with the GM tube (primarily with the wall by either the Photoelectric Effect or Compton scattering) it will produce an energetic electron that may pass through the interior of the tube.

Ionisation along the path of the primary electron results in low energy electrons that will be accelerated towards the centre wire by the strong electric field. Collisions with the fill gas produce excited states (~11.6 eV) that decay with the emission of a UV photon and electron-ion pairs (~26.4 eV for argon). The new electrons, plus the original, are accelerated to produce a cascade of ionisation called "gas multiplication" or a Townsend avalanche. The multiplication factor for one avalanche is typically $10^6$ to $10^8$. Photons emitted can either directly ionise gas molecules or strike the cathode wall, liberating additional electrons that quickly produce additional avalanches at sites removed from the original. Thus a dense sheath of ionisation propagates along the central wire in both directions, away from the region of initial excitation, producing what is termed a Geiger-Müller discharge.

The intense electric field near the, anode collects the electrons to the anode and repels the positive ions. Electron mobility is ~$10^4$ m/s or $10^4$ times higher than that for positive ions. Electrons are collected within a few μs, while the sheath of massive positive ions (space charge) surrounding the centre wire are accelerated much more slowly (ms) outward towards the cathode.

The temporary presence of a positive space charge surrounding the central anode terminates production of additional avalanches by reducing the field gradient near the centre wire below the avalanche threshold. If ions reach the cathode with sufficient energy they can liberate new electrons, starting the process all over again, producing an endless continuous discharge that would render the detector useless. An early method for preventing this used external circuitry to "quench" the tube, but the introduction of organic or halogen vapours is now preferred. The complex molecule of the quenching vapour is selected to have a lower ionisation potential (<10 eV) than that of the fill gas (26.4 eV). Upon collision with a vapour molecule the fill gas ion gives up ~10 eV to the quench vapour molecule which then quickly dissociates rather than losing its energy by radiative emission. The remainder of the partially neutralised vapour-atom energy (~4 eV) produces a UV photon that is strongly absorbed by the molecules and prevented from reaching the cathode. Any quench vapour that might be accelerated and impact the cathode dissociates on contact. Organic quench vapours, such as alcohols, are permanently altered by this process, limiting tube life to ~$10^9$ counts. Halogen quench vapours dissociate in a reversible manner later recombining for an essentially infinite life.

Geiger-Müller tubes are a simple, robust and well-established technology for the measurement of ionising radiation, insensitive to other effects and capable of use in many extreme environments. However, as with any instrument, it is possible for the detector to fail and cease responding to ionising radiation. This can be a serious deficiency, particularly if the instrument is used in a safety system to give warning of high radiation levels in an area of typically low radiation field. To overcome this deficiency a small radioactive 'keep-alive' source, typically a small β-source of localised emission, is often fitted in or adjacent to the GM tube, to provide a known small background of ionising radiation. The GM tube is then expected to provide a measurement signal indicating the presence of ionising radiation of at least the level provided by the "keep-alive" source. Failure of the detector then becomes apparent after a time dependent on the magnitude of the field and the sensitivity of the detector, since the GM tube will produce an output indicating a level of ionising radiation less than that provided by the "keep-alive" source.

This approach has several drawbacks. Firstly, recent developments in the sensitivity of GM tubes mean that the minimum external radiation field that can be detected is now comparable with that due to the 'keep alive' source. Accordingly, the measurement of low levels of external ionising radiation is hampered by the presence of the "keep-alive" source, whose signal tends to swamp any external measurements of very low value. In addition, the inclusion of a radioactive source in an instrument is considered undesirable for reasons of long term safety of personnel operating the instrument. The provision of radioactive sources within instruments also poses problems for end of life disposal, given the ever-tightening regulatory framework regulating the disposal of radioactive materials. The use of radioactive sources is generally also to be discouraged due to the potential for environmental contamination.

Other ionising radiation detectors based on, for example, scintillators and photodetectors may be less rugged and more sensitive to external effects, such as temperature, but their continued operation may be confirmed by testing with an optical pulser. This is not possible with known GM tubes.

The present invention aims to alleviate at least some of the problems of the known systems.

Accordingly, the present invention provides a radiation detector, comprising a sensitive volume filled with a counter gas; an anode and a cathode each in communication with the counter gas; a voltage supply for maintaining a potential difference between the anode and the cathode, said potential difference being less than required to cause gas discharge in the counter gas. The radiation detector further comprises a photoemissive material in communication with the sensitive volume.

The photoemissive material may be provided as a coating on the cathode.

The present invention also provides a radiation detector, comprising a Geiger-Müller tube having a photoemissive coating on its cathode.

The radiation detector may further comprise a controllable light source for supplying photons of a known wavelength to the photoemissive material, whereby electrons are emitted by the photoemissive material in response to the provision of said photons, said electrons causing avalanche breakdown of the counter gas, indicating satisfactory operation of the radiation detector.

The light source may comprise one of: a light-emitting diode and an incandescent light bulb. The light source may emit light of visible wavelengths. Photons from the light source may be provided to the photoemissive material via an optical fibre. The light source may be placed within the sensitive volume.

In certain embodiments of the invention, the cathode is in the form of a hollow cylinder, and the anode is in the form of a conductor substantially aligned with the axis of the cylinder.

The photoemissive material may comprise at least one rare-earth oxide.

The above, and further, objects, characteristics and advantages of the present invention will become more apparent with reference to the following description of certain embodiments, given by way of examples only, in conjunction with the accompanying drawings.

FIGS. 1-4 each illustrate a radiation detector according to a respective embodiment of the invention.

The present invention provides a modification to radiation detectors such as Geiger-Müller ("GM") tubes. The modification enables a radiation detector to be tested in-situ without the need for a radioactive source.

According to an aspect of the present invention, the radiation detector is made sensitive to non-ionising radiation, typically light in a range of wavelengths including infra-red, visible and ultra-violet, to enable an optical test pulse to trigger breakdown within the radiation detector and confirm continued satisfactory operation.

The present invention provides a photo-emissive material within the radiation detector, which, when exposed to light, emits electrons, which will then trigger avalanche breakdown of the radiation detector, confirming its continued satisfactory operation.

Suitable photo-emissive materials are typically rare-earth oxides or mixtures of rare-earth oxides, such as are currently used for example as cathode coatings in the construction of photo-multiplier tubes to produce their sensitivity to incident light.

When such a material is introduced into the sensitive volume of a GM tube and exposed to an optical pulse of an appropriate wavelength, the photoelectrons produced will trigger avalanche breakdown and produce an electrical output pulse, confirming continued satisfactory performance of the detector. The photo-emissive material could be coated onto the cathode of the radiation detector for optimal efficiency in generating a breakdown.

A control circuit is provided, which supplies activation energy, such as a voltage pulse, to the light source at predetermined intervals. The control circuit will then monitor the output of the radiation detector for a measurement pulse corresponding to the activation of the light source. If a corresponding measurement pulse is provided, then the radiation detector is confirmed as operating satisfactorily. If no measurement pulse is provided, then the radiation detector has a fault. Of course, the fault may lie within the control circuit or the light source, meaning that no photons are supplied to the photoemissive material. However, the radiation detector itself may be at fault. The radiation detector should then be removed from use immediately and replaced or serviced.

The optical pulse can be generated in several ways. The light source may be, for example, a light emitting diode (LED) or an incandescent source such as a light bulb. The light source may be integral to the radiation detector, for example placed within the sensitive volume in which case provision must be made for supplying activation energy to the light source. Alternatively, the light source may be arranged to provide photons through a transparent or translucent window in the radiation detector. The light source may be placed distant from the radiation detector, with geometrical optics or an optical fibre provided to carry photons from the light source to the photo-emissive material. The radiation detector may be fitted with an optical fibre or window to couple to an external light source.

FIG. 1 illustrates a first embodiment of the present invention, in the form of a GM tube 10. A hollow cylindrical cathode 20 encloses and defines a sensitive volume 22. An anode 24 in the form of a wire or bar is provided along the length of the cathode, substantially along the axis of the cylinder. A gas tight enclosure (not illustrated) is provided, enclosing the anode, the cathode and the sensitive volume. A voltage source 25 maintains a potential difference of typically several hundred volts between the anode and the cathode. A resistance 26 is provided, to convert the current pulses caused by discharge in the tube 10 into voltage pulses. The voltage pulses may be capacitively coupled to a loudspeaker 28 and/or a counter 30 to provide an audible and/or visual indication of the discharge within the tube 10. The system of FIG. 1 described thus far, in this paragraph, is conventional.

According to certain aspects of the present invention, a photoemissive material is provided within the sensitive volume 22. In the particular embodiment shown in FIG. 1, the photoemissive material is provided as a photoemissive coating 32 over the entire inner surface of the cathode 20. According to another aspect of the present invention, a light source 34 is provided, in a location selected such that photons emitted by the light source 34 may reach the photoemissive coating 32. The light source 34 may be within, or outside of the cathode 22. The light source 34 may be within, or outside, the gas tight enclosure (not shown). Geometrical optics or an optical fibre may be provided to carry photons from the light source 34 to the photo-emissive material 32. Selection of the location of the light source may depend on may factors. For example, having an external light source will ease the task of replacing incandescent bulbs. Placing an LED light source inside the cathode will result in a smaller overall device. Placing the light source in a location where it may be directly observed by a user will provide the reassurance that the light source is working, and so that the radiator detector is being correctly tested.

The light source 34 may emit light in the infra-red, visible or ultra-violet wavelength ranges. The light source must be selected such that the photons it emits are of suitable wavelength the release photons from the photoemissive material 32. The photoemissive material 32 may be made up of one or more rare earth oxides, for example rubidium oxide, caesium oxide, thorium oxide or cerium oxide.

Control circuitry 36 supplies activation energy, such as a voltage pulse, to the light source 34. If the light source and the radiation detector are working correctly, a corresponding return voltage pulse will be provided by the GM tube 10, and detected by the loudspeaker 28 and/or counter 30. The return voltage pulse is also provided to the control circuitry 36. If no return voltage pulse is detected by the control circuitry, this indicates a malfunction and the control circuitry may cause an alarm signal to the operator. Since the return voltage pulse provided in response to the activation of the light source does not indicate a real radiation detection, the control circuitry may be arranged 38 to deduct the corresponding value from the counter 30.

The control circuitry repeats this testing operation at predetermined intervals. The interval may be selected in accordance with the environments of the radiation detector. In some environments, a testing rate of once every ten minutes or once per hour may be sufficient. In other applications, it may be appropriate to repeat the test every minute, or less. Each test cycle may comprise a single activation of the light source, or may involve a number of repeated activations, for example, six activations at one second intervals every ten minutes. This may provide for some error filtering: if five of the six measurements indicate that the radiation detector is functioning normally, then one abnormal result may perhaps be ignored.

FIG. 2 shows a second embodiment of the present invention. In this embodiment, the photoemissive coating 32 is provided only on a portion of the inner surface of the cathode 20. The portion coated in the photoemissive material must lie in a line of sight from the light source, via any optical fibre or geometrical optics which may be provided. This embodiment may reduce the cost of the photoemissive material used, and may alleviate any adverse effects of the photoemissive coating on the operation of the radiation detector.

FIG. 3 shows a third embodiment of the present invention. In this embodiment, the light source, probably an LED in this case, is placed within the sensitive volume 22. A relatively small area of the cathode is coated with photoemissive material 32. This small area is placed in a location which will receive photons emitted by the light source 34. This embodiment will provide a smaller overall device, and will further alleviate any adverse effects of the photoemissive coating on the operation of the radiation detector.

Figure 4:
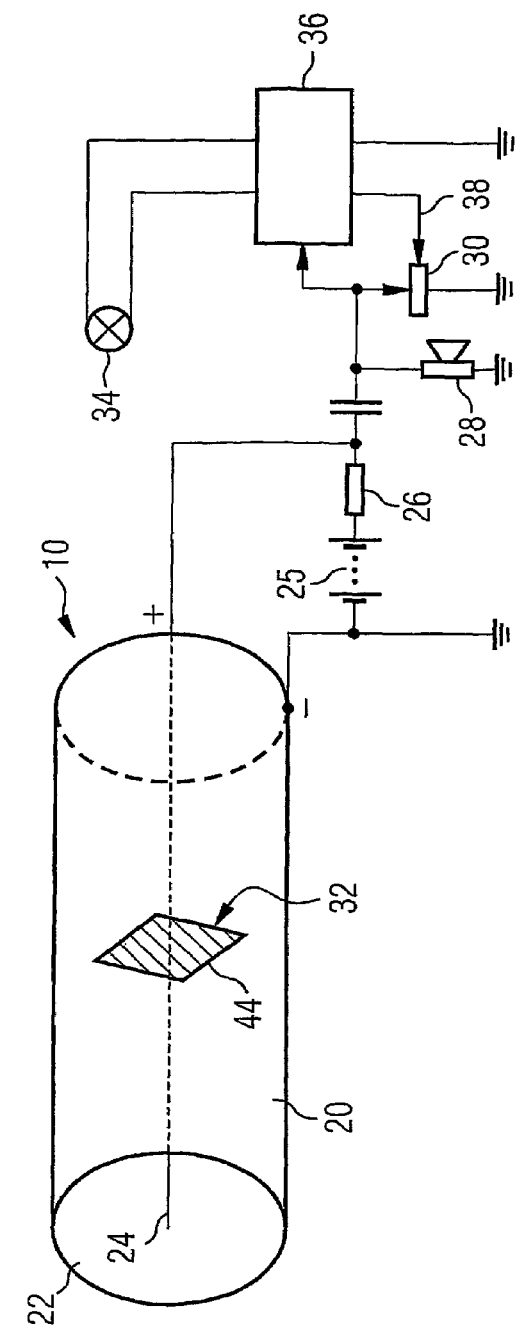

FIG. 4 illustrates a further embodiment of the present invention, wherein the photoemissive material 32 is provided upon a carrier 44 mounted generally within the radiation detector. Carrier 44 may be an electrically insulating material such as mica or polyethylene, mounted on the anode 44. The carrier and particularly the coating 32 must be placed in a location where it will receive photons from the light source 34. This embodiment illustrates that it is not necessary for the photoemissive material to be applied to the cathode of the radiation detector.

The present invention accordingly provides a radiation detector with a self-testing and monitoring function, which avoids the need for a radioactive "keep-alive" source to be provided. This provides the further advantages of enabling the radiation detector to detect lower levels of external radiation, while avoiding the problem of long term exposure of operators to potentially harmful radiation, reduces the risk of environmental contamination and simplifies end of life disposal of the radiation detector.

While the present invention has been described with reference to a limited number of particular embodiments, the invention is not so limited. The present invention is limited only as recited in the appended claims.

The invention claimed is:

1. A radiation detector for detecting ionizing radiation having a wavelength within a first range, said radiation detector comprising:
   detecting means responsive to said ionizing radiation incident thereon, for generating an output signal indicative of said ionizing radiation; and
   self-testing means for determining that said detecting means continues to operate properly to detect ionizing radiation, said self testing means comprising,
      a photoemissive material in communication with the detecting means;
      a controllable light source for supplying nonionizing radiation of a known wavelength to the photoemissive material, which known wavelength is within a second range that differs from said first range, whereby ionizing radiation is emitted by the photoemissive material in response to the provision of said nonionizing radiation, said ionizing radiation impinging on the detecting means; and
   control means for supplying activation energy to the light source at predetermined intervals, monitoring the output of the radiation detector to detect any measurement pulses corresponding to activation of the radiation detector by the activation of the light source, deciding in response to such detection that the radiation detector is satisfactorily responsive to ionizing radiation, and deciding, in the absence of such detection that the radiation detector has a fault.

2. A radiation detector for detecting incident ionizing radiation, said radiation detector comprising detecting means responsive to ionizing radiation incident thereon, for generating an output signal indicative of said incident ionizing radiation, said detecting means comprising a sensitive volume filled with a counter gas; an anode and a cathode each in communication with the counter gas; and a voltage supply for maintaining a potential difference between the anode and the cathode, said potential difference being less than required to cause gas discharge in the counter gas, such that incident ionizing radiation causes avalanche breakdown of the counter gas, which breakdown is detected by the detecting means, wherein the radiation detector further comprises:
   a photoemissive material in communication with the sensitive volume of the detecting means;
   a controllable light source for supplying photons of nonionizing radiation of a known wavelength to the photoemissive material, whereby electrons are emitted by the photoemissive material in response to the provision of said photons, said electrons causing avalanche breakdown of the counter gas of the detecting means, which breakdown is detected by the detecting means, indicating satisfactory operation of the radiation detector; and
   control means for i) supplying activation energy to the light source at predetermined intervals, ii) monitoring the output of the radiation detector to detect any measurement pulses corresponding to activation of the radiation detector by activation of the light source, iii) deciding, in response to such detection, that the radiation detector is satisfactorily responsive to ionizing radiation; and iv) deciding, in the absence of such detection, that the radiation detector has a fault.

3. The radiation detector according to claim 2, further arranged to generate an alarm in response to deciding that the radiation detector has a fault.

4. The radiation detector according to claim 2, further arranged to deduct the measurement pulses corresponding to activation of the radiation detector by the activation of the light source from the output of the radiation detector.

5. The radiation detector according to claim 2, further arranged such that, at each interval, repeated activations of the light source occur, and the decision on the state of the radiation detector is decided with error filtering.

6. The radiation detector according to claim 2, wherein the photoemissive material is provided as a coating on the cathode.

7. The radiation detector according to claim 2, wherein the radiation detector comprises a Geiger-Müller tube having a photoemissive coating on its cathode.

8. The radiation detector according to claim 2, wherein the cathode is in the form of a hollow cylinder, and the anode is in the form of a conductor substantially aligned with the axis of the cylinder.

9. The radiation detector according to claim 2, wherein the light source comprises one of: a light-emitting diode and an incandescent light bulb.

10. The radiation detector according to claim 2, wherein the light source emits light of visible wavelengths.

11. The radiation detector according to claim 2, wherein photons from the light source are provided to the photoemissive material via an optical fiber.

12. The radiation detector according to claim 2, wherein the light source is placed within the sensitive volume.

13. The radiation detector according to claim 2, wherein the photoemissive material comprises at least one rare-earth oxide.

14. A method for testing operational status of a detector for detecting incident ionizing radiation that has a wavelength within a first range, said method comprising:
    providing a photoemissive material in communication with a detecting unit that outputs a signal in response to said ionizing radiation incident thereon;
    irradiating said photoemissive material with nonionizing radiation having a wavelength which is within a second range that differs from said first range, and which causes said photoemissive material to irradiate said detecting unit with ionizing radiation having a wavelength that is within said first range;
    determining that the detector is properly responsive to ionizing radiation if a signal is output in response to said light pulses; and
    determining that the detector is not properly responsive to ionizing radiation if no such signal is output.

15. A method for detecting external ionizing radiation, comprising:
    providing a detector that emits signals in response to ionizing radiation incident thereon, which ionizing radiation has a wavelength within a first range; and
    periodically checking responsiveness of said detector to said ionizing radiation, by
    providing a photoemissive material in communication with said detector:
    irradiating said photoemissive material with nonionizing radiation having a wavelength which is within a second range that differs from said first range, and which causes said photoemissive material to irradiate said detector with ionizing radiation having a wavelength that is within said first range;
    determining that the detector is properly responsive to ionizing radiation if a signal is output in response to said light pulses; and
    determining that the detector is not properly responsive to ionizing radiation if no such signal is output.

* * * * *